United States Patent
Lee et al.

(10) Patent No.: US 6,978,353 B2
(45) Date of Patent: Dec. 20, 2005

(54) LOW OVERHEAD SNAPSHOT IN A STORAGE ARRAY USING A TREE-OF-SLABS METADATA

(75) Inventors: Whay Sing Lee, Newark, CA (US); Raghavendra J. Rao, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 459 days.

(21) Appl. No.: 10/273,634

(22) Filed: Oct. 18, 2002

(65) Prior Publication Data

US 2004/0078533 A1  Apr. 22, 2004

(51) Int. Cl.[7] .............................................. G06F 12/00
(52) U.S. Cl. ...................... 711/162; 711/203
(58) Field of Search .................. 711/161, 162, 203; 707/204

(56) References Cited

U.S. PATENT DOCUMENTS

| | | | |
|---|---|---|---|
| 6,397,308 B1 * | 5/2002 | Ofek et al. ................. | 711/162 |
| 6,484,186 B1 | 11/2002 | Rungta | |
| 6,532,479 B2 | 3/2003 | Souder et al. | |
| 2004/0064463 A1 | 4/2004 | Rao et al. | |

OTHER PUBLICATIONS

"Sun StorEdge Instant Image Software Architecture Guide", Dec. 2001, 52 pgs.

* cited by examiner

Primary Examiner—Pierre M. Vital
(74) Attorney, Agent, or Firm—Meyertons Hood Kivlin Kowert & Goetzel, P.C.; B. Noël Kivlin

(57) ABSTRACT

A method for creating a point-in-time copy of a data store. A command to create a point-in-time copy of an original data store is received. The processing of input/output operations to the original data store is suspended. A metadata structure of a copy data store is created. The metadata structure contains a null metadata slab tree, a backing store register, and a copy record, the copy record containing a pointer to a metadata structure of the original data store, the metadata structure of the original data store containing a pointer to the metadata structure of the copy data store. The processing of input/output operations to the original data store and to the copy data store is resumed.

27 Claims, 5 Drawing Sheets

LOW OVERHEAD SNAPSHOT IN A STORAGE ARRAY USING A TREE-OF-SLABS METADATA

FIELD

Embodiments of the invention relates generally to the field of data storage and more particularly to methods for efficiently obtaining a point-in-time copy (snapshot) of a data store.

BACKGROUND

The continued increase in data storage has been accompanied by an increasing need to have an accurate record of the state of particular data stores at specified times. A snapshot is a point-in-time image of a given data store. Snapshots may be created to effect recovery of data upon a catastrophic failure or to maintain a record of the state of the data at given times. Typical data storage systems may have a capacity of a terabyte (TB) or more. Such storage may be organized as a number of storage units of more practical size known as virtual logical units (VLUs). VLUs have their own well-defined virtual block address (VBA) space, and typically range in size upward from several hundred megabytes (MB). A snapshot may be created for an original VLU (parent VLU) at a user-specified time. The snapshot VLU (child VLU) then contains an exact copy of the parent VLU at the specified time. This child VLU can be accessed and modified just like any other VLU.

One typical approach to creating a snapshot is to make an actual copy of the entire VLU. For example, upon receiving a command to snapshot a VLU, all new data access requests (I/O requests—reads and WRITEs) to that VLU are halted, a child VLU of the same size is created, and the entire content of the parent VLU is copied into the child VLU. Both VLUs are then available to the user. Copying the contents of one VLU to another to create a snapshot is both time-consuming and an inefficient use of storage space. For example, a 1 TB VLU may require several hours or even days to completely copy during which time the parent VLU is unavailable for data access. Moreover, the storage space required for the child VLU is equal to the size of the parent VLU.

A variant of this approach is for the system to initiate a background copying operation when the snapshot command is received without accepting new data access requests. In such a system, when a WRITE/READ operation is received, the system first checks to see if the requested data block has already been copied into the child VLU. If the block has not yet been copied to the child VLU, the system explicitly makes the copy before allowing the requested operation to be serviced. A bitmap may be used to keep track of the data blocks that have been copied. This approach alleviates the problem of the VLU being inaccessible for long periods, but is still space inefficient.

A typical data storage system contains an array of disk drives, a controller for controlling access to the disk array, and a cache memory for storing recently accessed data so as to provide quick access to data that is likely to be accessed in the near-term without having to access the disk on every occasion. Since a particular file or block of data may be located on the disk or in the cache, the storage device typically includes metadata (MD) that registers all data blocks currently in the cache and, therefore, indicates whether a data block is on the disk or stored in cache. If the data block is in the cache, the MD indicates where the data block is stored in the cache. The MD may also indicate the current state of the data block (e.g., whether or not it has been "flushed" to disk). For such a system, another typical approach to creating a snapshot is to create a copy of the MD of the parent VLU when the snapshot command is received. The new copy of MD is then assigned to the child VLU. With this approach, data access to the parent VLU is interrupted only long enough to make a copy of the MD. That is, because both copies of the MD point to the same data, the child VLU presents an image that is identical to the parent VLU immediately after the MD is copied. Thus both the parent VLU and the child VLU can be made available to the user as soon as the MD is copied. Subsequently, if a WRITE is received for either VLU, the system checks to see if the MD of the child VLU and the MD of the parent VLU for the corresponding VBA are still pointing to the same data blocks. If not, the WRITE operation proceeds normally. Otherwise, a copy of the data block involved is made, and linked into the metadata for the child VLU before the WRITE operation is permitted to proceed. A bitmap or scoreboard may be used to keep track of the blocks that have been copied. Alternatively, the MD need not be entirely copied when the snapshot command is received. Instead, space for the MD and the bitmap is allocated, but left empty. A cleared 'copied' bit implicitly indicates that a corresponding MD entry in the child VLU is identical to that in the parent VLU. A MD entry for the child VLU is filled in only when the corresponding data block is copied. With such an approach, the time during which data access is interrupted is reduced because only a relatively small amount of information (i.e., the MD) is copied before the VLUs are made available to the user again. Copying only the MD also has the advantage of needing only as much new disk storage space as the amount of changes made to the VLUs after the snapshot is created. However, since each snapshot requires a complete copy of the metadata, this approach has a major drawback where snapshots of the same VLU are required frequently. Frequent snapshot commands imply that the differences in data content between consecutive snapshots are small, and that the number of snapshots that the system must support is large. Because the MD structure is usually stored in non-volatile memory (NVRAM), which is a limited resource in a storage array, an array may quickly exhaust available NVRAM, and be unable to create snapshots until previous snapshots are deleted. Since space for the MD structure is allocated when the snapshot command is first received, delayed copying as discussed above does not alleviate the problem of limited NVRAM. Moreover, some MD structures are large enough that the times to copy only MD structure is prohibitive.

SUMMARY

An embodiment of the present invention provides a method for creating a point-in-time copy of a data store. A command to create a point-in-time copy of an original data store is received. The processing of input/output operations to the original data store is suspended. A metadata structure of a copy data store is created. The metadata structure contains a null metadata slab tress, a backing store register, and a copy record, the copy record containing a pointer to a metadata structure of the original data store, the metadata structure of the original data store containing a pointer to the metadata structure of the copy data store. The processing of input/output operations to the original data store and to the copy data store is resumed.

Other features and advantages of embodiments of the present invention will be apparent from the accompanying drawings, and from the detailed description, that follows below.

DESCRIPTION OF THE DRAWINGS

The invention may be best understood by referring to the following description and accompanying drawings that are used to illustrate embodiments of the invention. In the drawings.

DETAILED DESCRIPTION

Overview

Figure 1:
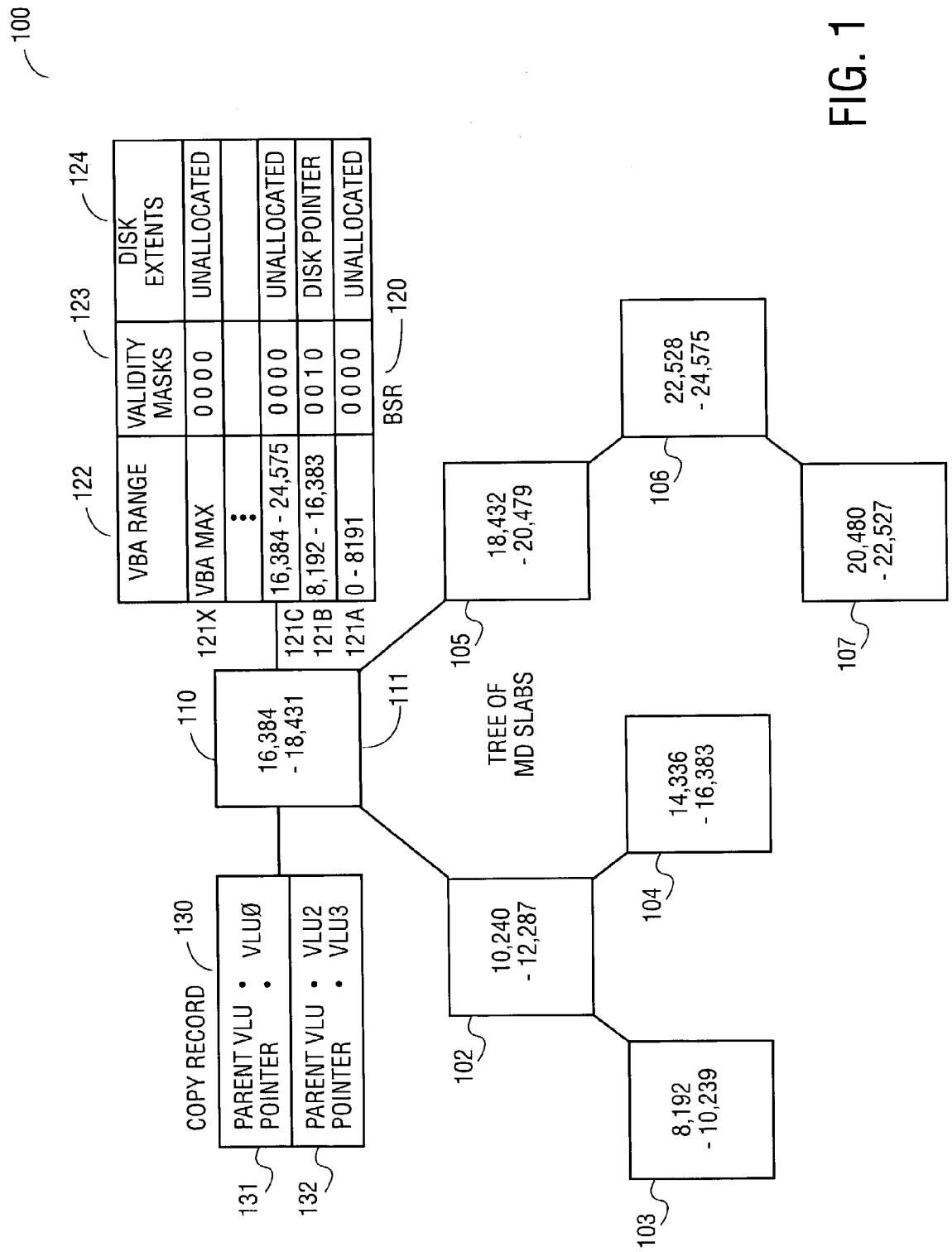
FIG. 1 illustrates a MD structure including a tree of MD slabs, a BSR, and a copy record in accordance with one embodiment of the present invention.

An embodiment of the present invention implements a MD structure for efficient point-in-time copying of an original VLU in response to a snapshot command. In one embodiment of the present invention the MD structure includes a tree of MD slabs, a backing store register (BSR), and a copy record. The tree of MD slabs is organized as described in co-pending U.S. patent application Ser. No. 10/261,545, filed on Sep. 30, 2002, entitled "Memory-Efficient Metadata Organization in a Storage Array". In such organization, the tree of MD slabs is organized as having a plurality of nodes (slabs), each node containing a MD table. Each of the MD tables has a plurality of entries. Each of the entries in the MD table represents a contiguous range of block addresses and contains a pointer to a cache slot storing a data block corresponding to the block address, or an indicator to indicate that the corresponding data block is not stored in a NVRAM cache slot. Each MD table also contains a block address range indicator to indicate the contiguous range of block addresses, and at least one pointer to point to any parent or child nodes. In one embodiment, the size of each cache slot is an integral multiple of the size of each MD slab.

In accordance with one embodiment of the present invention, the MD structure for each VLU includes, in addition to the tree of MD slabs, a BSR and a copy record. The BSR includes a number of entries each containing three fields. The first field indicates a contiguous VBA range represented by the entry, this VBA range is a fixed integral multiple of the contiguous VBA range represented by each MD slab. The second field contains a bit corresponding to each MD slab in the VBA range representing the BSR entry. The third field either points to a contiguously addressed region on a disk subsystem, appropriately sized to accommodate the data blocks for the VBA range of the BSR entry, or indicates that no disk storage space has been assigned for the VBA range. The copy record includes a "Parent VLU" field that includes a pointer to the MD structure of a parent VLU, and a "Child VLU" field having one or more pointers to child VLUs, if any.

In accordance with one embodiment, upon receiving the snapshot command, the new MD structure is implemented for the child VLU, and the "Parent VLU" field in the child VLU's copy record is pointed to the parent VLU's MD structure while the MD structure of the child VLU is linked to the "Child VLU" field of the parent VLU's copy record. At this point the snapshot operation is complete and both the parent and child VLUs are available for data access operations.

An intended advantage of one embodiment of the present invention is to reduce the time between when a snapshot command is received and when the parent and child VLUs are available for I/O operations. Another intended advantage of one embodiment of the present invention is to reduce the amount of data and MD (and hence the amount of NVRAM allocated for MD storage) that is copied in response to a snapshot command.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Metadata Structure Organization

FIG. 1 illustrates a MD structure including a tree of MD slabs, a BSR, and a copy record in accordance with one embodiment of the present invention.

Tree of Metadata Slabs

MD structure 100, shown in FIG. 1, includes a tree of MD slabs 110 in accordance with one embodiment. The tree of MD slabs 110 is used to show which data blocks are stored in cache for the child VLU for which the MD structure 100 has been implemented. The tree of MD slabs 110 includes slabs 111–117 each of which is a MD slab representing a standard size region of NVRAM that represents a specified contiguous range of VBAs. In the exemplary tree of MD slabs 110, each MD slab of the tree has a range of 2048 VBAs. The range (size) of each slab may be related to the cache line size. For example, for a system having a cache line with a capacity of 4K bytes (i.e., eight 512-byte blocks), a slab with 256 entries having an addressing capability of 1M bytes may be implemented. That is, each of the 256 entries in the slab addresses one cache line containing eight 512-byte blocks, thus producing a range of 2048 VBAs.

Each MD slab contains the MD entries for the specified range in a directly indexable manner, in which each MD entry in the table also includes a pointer to an arbitrary data cache slot. Each slab also contains a VBA range field, a parent slab pointer, a child slab pointer, and MD entries, (not shown). The tree of MD slabs may be organized using conventional search-tree properties. For example, the VBA range represented by a slab's left child is always lower then the range of the slab itself, and the VBA range represented by the slab's right child is always higher then that of the slab itself.

Backing Store Register

MD structure 100 also includes a BSR 120. Whereas the tree of MD slabs 110 indicates which data blocks of the child VLU are stored in cache, the BSR 120 is used to determine which data blocks have been previously flushed (copied) to disk from the cache. The BSR 120 is shown as a linear table, but may be implemented in various ways in alternative embodiments. For example, the BSR may be implemented as a tree-structure, similar to the tree of MD slabs 110, where null entries do not consume any NVRAM space.

BSR 120 includes a number of entries 121a through 121x each representing a contiguous range of VBAs of the child VLU. The VBA range field 122 indicates the range of VBAs for each entry. The contiguous range of VBAs is a fixed integral multiple, K, of the VBA range represented by each MD slab of the tree of MD slabs 110. For example, the VBA range represented by each MD slab of the tree of MD slabs 110 is 2048 VBAs and the VBA range of each entry of BSR 120 is 8192, thus K is equal to 4.

The validity masks field 123 indicates which data blocks of the child VLU have been flushed to disk. The validity masks field contains K bits, each corresponding to a VBA range equal to the VBA range of a MD slab. If a bit is set (i.e., equal to 1), this indicates that the data blocks corresponding to the VBA range (MD slab VBA range) have been flushed to disk. For example, entry 121b has a VBA range of 8192–16,383, which corresponds to 4 MD slabs having VBA ranges of 8192–10,239, 10,240–12,287, 12,288–14,335, and 14,336–16,383, respectively. The validity mask field of entry 121b indicates that the data blocks corresponding to the third MD slab-sized VBA range, namely VBA range 12,288–14,335, have been flushed to disk. If the bit is not set, this indicates that the data blocks have not been flushed to disk (i.e., they are in the cache of the child VLU or have not been copied to the child VLU). For example, the unset bits of the validity mask field of entry 121b indicate that the data blocks corresponding to VBA ranges of 8192–10,239, 10,240–12,287, and 14,336–16,383, have not been flushed to disk. These data blocks are in the cache of the child VLU as indicated by MD slabs 103, 104, and 102, respectively, of the tree of MD slabs 110. The unset bits of the validity mask filed 123 of entry 121a indicate that data blocks corresponding to the VBA range of 0–8191 have also not been flushed to disk. However, the corresponding 4 MD slabs having VBA ranges of 0–2047, 2048–4095, 4096–6143, and 6144–8191, respectively, do not appear in the tree of MD slabs 110 indicating that none of the data blocks corresponding to 0–8191 have not been copied to the child VLU.

The disk extents field 124 either points to a contiguously addressed region on a disk subsystem, appropriately sized to accommodate the data blocks for the VBA range of the BSR entry, or indicates that no disk storage space has been assigned for the VBA range. For example, the validity masks of entries 121a and 121c indicate that no data blocks of the corresponding VBA ranges have been flushed to disk, consequently the disk extent field for each entry indicates that no disk storage space has been assigned for the VBA range of that entry. The validity mask of entry 121b indicates that at least some of the data blocks (i.e., those corresponding to VBA range 12,288–14,335) of the corresponding VBA range have been flushed to disk. Therefore, the disk extent field for entry 121b contains a pointer to a contiguously addressed region on a disk subsystem, appropriately sized to accommodate the data blocks for the VBA range of the BSR entry (i.e., data blocks corresponding to VBAs 8,192–16, 383).

The BSR 120 as described in FIG. 1 contains one validity mask bit for each MD slab. When the validity bit is set, it indicates that a local copy of all of the data blocks represented by the corresponding MD slab has been placed on a disk space that is separate from that which is owned by the parent VLU. Therefore, for a child VLU, when a data block is flushed from cache into disk for the first time, all of the data blocks represented by the same MD slab are also flushed to disk at the same time. A new pointer in the disk extent field is allocated, if necessary. The corresponding validity bit in the BSR is then set. This can be accomplished in various way for alternative embodiments, For example, in one embodiment, the old data blocks corresponding to an entire MD slab are propagated at one time. In an alternative embodiment, only the affected old data block(s) are propagated. In such an embodiment, the affected old data blocks are kept in cache and the corresponding validity bit in the BSR is not set. When the data block(s) are flushed back to cache, the remaining data blocks corresponding to the same MD slab are retrieved from the parent VLU and written to disk at the same time.

BSR 120 employs one validity bit for each MS slab. In alternative embodiments, a validity bit may represent more than one MS slab, or a validity bit may represent only a portion of a MD slab. That is, a coarser or finer granularity may be chosen using fewer or more validity bits to represent the VBA ranges in each BSR entry.

Copy Record

MD structure 100 also includes a copy record 130. The copy record 130 contains a parent VLU pointer 131 that points to the VLU MD structure of the parent VLU of the VLU to which MD structure 100 pertains. For example, if the MD structure 100 pertains to a VLU designated as VLU1, and was created in response to a command to "snapshot" a VLU designated as VLU0, Then the parent VLU pointer 131 of copy record 130 points to the MD structure of VLU0. The parent VLU pointer points to a single VLU metadata structure, since each VLU can be a point-in-time copy of only one original VLU. The copy record may also contain one or more child VLU pointers 132 that point to the MD structure of any child VLUs of the VLU to which MD structure 100 pertains. Child VLU pointers 132 may include any number of pointers, since multiple snapshots can be taken of the same original VLU. As shown in FIG. 1, child VLU pointers 132 contain pointers to the MD structures of VLU2 and VLU3. This means that two snapshots were made of the VLU to which MD structure 100 pertains.

Metadata Structure Created Upon "Snapshot" Command

Figure 2:
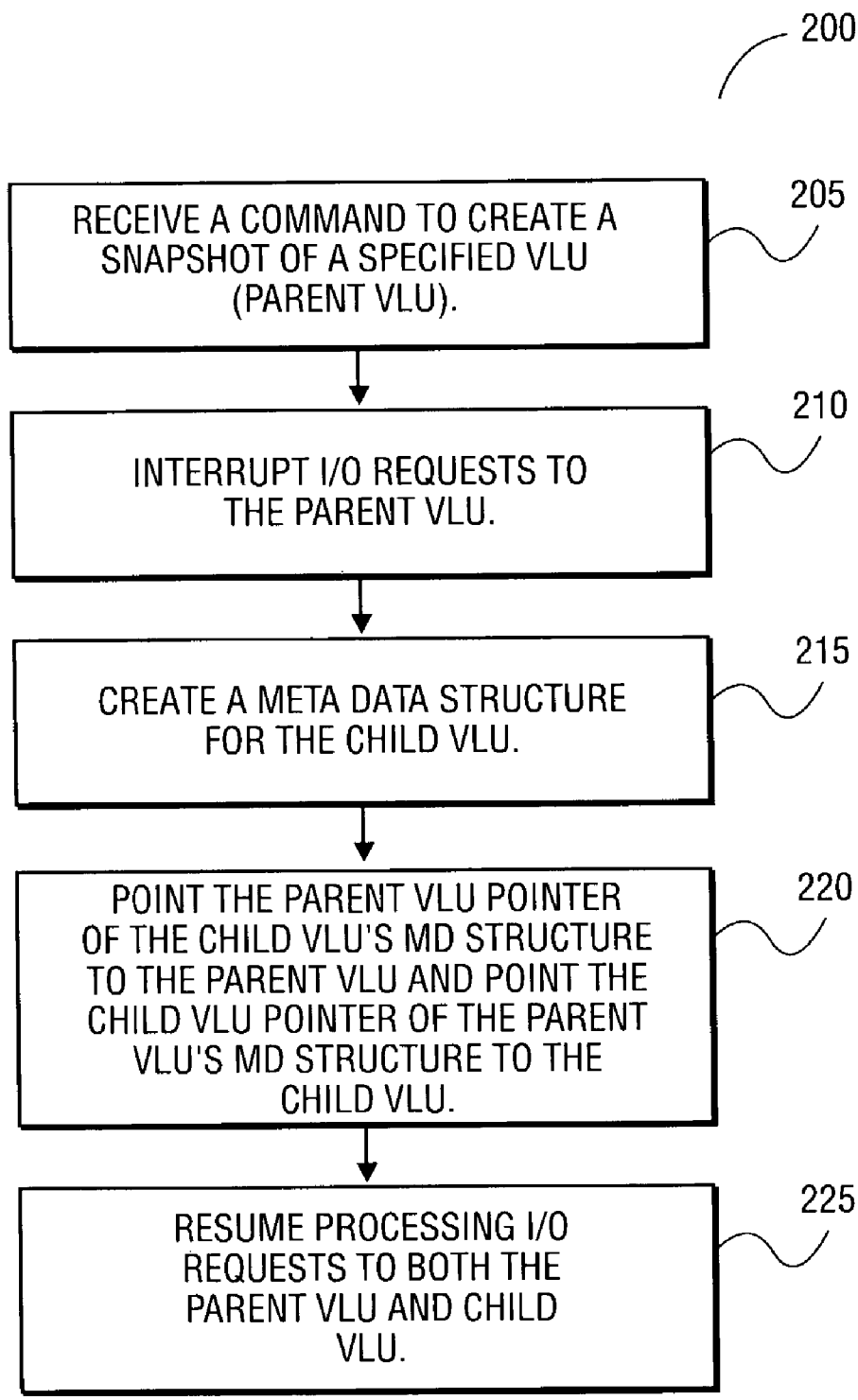
FIG. 2 is a process flow diagram of a process by which a point-in-time copy (snapshot) of a VLU is made, in accordance with one embodiment of the present invention.

In accordance with one embodiment, when a snapshot command is received a MD structure is created for the child VLU. This can be done very quickly relative to typical snapshot methods because the MD structure contains only a null tree of MD slabs containing (i.e., a null root node), a BSR, also null, initially, and a copy record. None of the data or MD of the parent VLU is copied. FIG. 2 is a process flow diagram of a process by which a point-in-time copy (snapshot) of a VLU is made, in accordance with one embodiment of the present invention. Process 200, shown in FIG. 2, begins with operation 205 in which a command to create a point-in-time copy of a specified VLU (parent VLU) is received by a data storage system. The parent VLU may, itself, be a snapshot of another VLU and may also have had previous created child VLUs. At this point, I/O requests to the parent VLU are interrupted at operation 210. At operation 215, a MD structure pertaining to the snapshot copy (child VLU) is created. In one embodiment, the child VLU's MD structure contains a null tree of MD slabs containing (i.e., a null root node), a null BSR, and a copy record. At operation 220 the parent VLU pointer of the copy record of the child VLU's MD structure is pointed to the parent VLU, and the child VLU pointer of the parent VLU's MD structure is pointed to the child VLU. At this point none of the actual data or MD of the parent VLU has been copied, and therefore no disk space or cache space has been expended on the snapshot copy. At operation 225 the processing of I/O commands to the parent VLU as well as the child VLU is resumed after only a relatively minor delay.

Figure 3A:
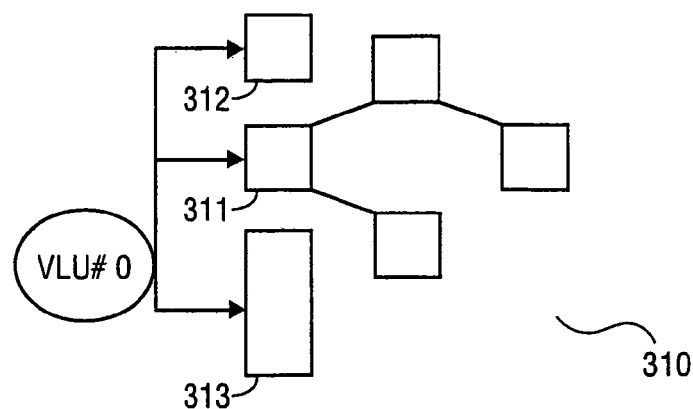
FIG. 3 is a block diagram illustrating the creation of a MD structure pertaining to a child VLU in response to a snapshot command in accordance with the process described in FIG. 2.
Figure 3B:
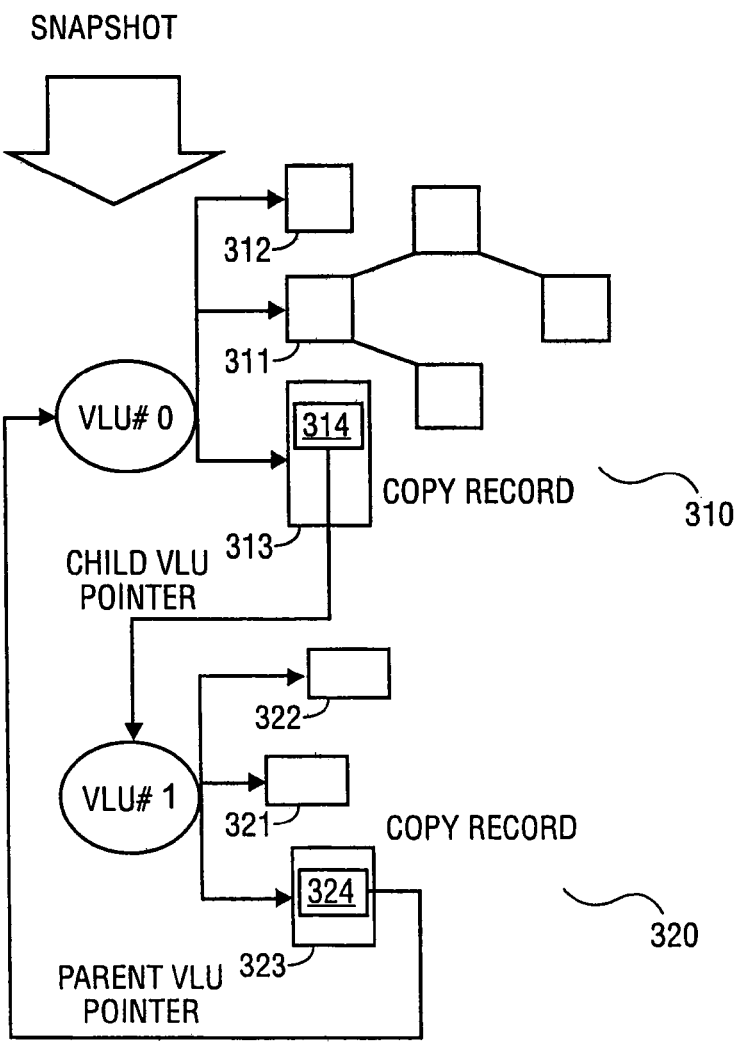

FIGS. 3A and 3B illustrate the creation of a MD structure pertaining to a child VLU in response to a snapshot command in accordance with the process described in FIG. 2. As shown in FIG. 3A, MD structure 310 corresponding to VLU0 includes a tree of MD slabs 311, a BSR 312, and a copy record 313, all as described above in reference to FIG. 1. As shown in FIG. 3B, when a snapshot command is received, a new MD structure 320 is created corresponding to the child VLU (i.e., VLU1). The new MD structure 320 includes a NULL tree of MD slabs 321, a null BSR 322, and a copy record 323. The parent VLU pointer 324 in the copy record 323 of the new MD structure 320, is pointed to the MD structure 310 corresponding to VLU0. The MD structure 320 is linked into the child VLU pointer of MD structure 310. At this point, the snapshot operation is complete, and both parent VLU, VLU0 and child VLU, VLU1 can be made available for the processing of I/O requests.

Processing I/O Requests

As described above, in accordance with the present invention, a snapshot command does not result in any the copying of any data, or metadata of the parent VLU, but only the creation of a MD structure for the child VLU. This allows almost immediate I/O access to the parent and child VLUs and efficiently utilizes disk and cache resources. Initially both the tree of MD slabs and the BSR of the MD structure corresponding to the child VLU are null, but are populated as subsequent I/O requests are processed.

Write Operation

Figure 4:
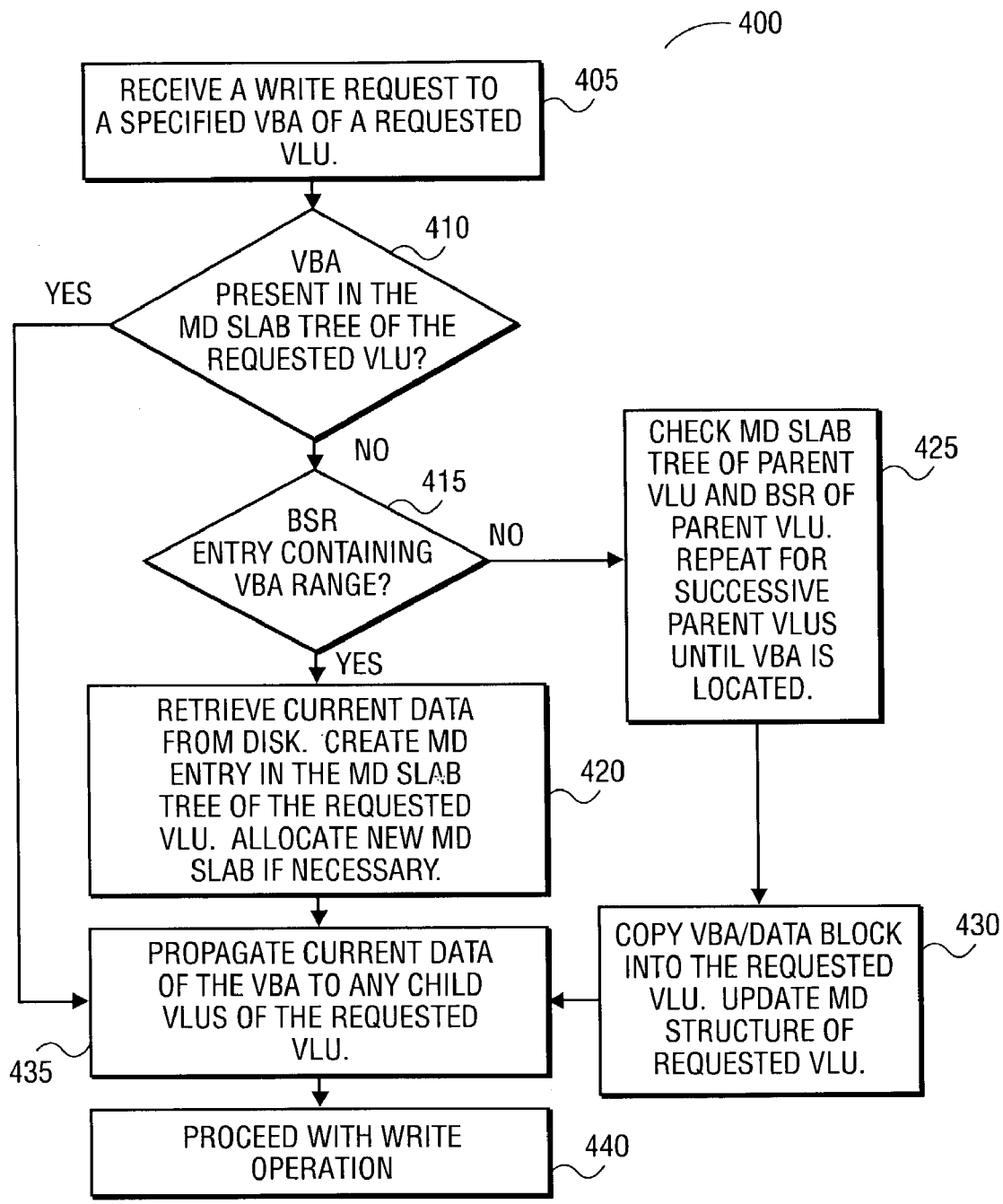
FIG. 4 is a process flow diagram of a process by which a WRITE operation is requested and executed in accordance with one embodiment of the present invention.

When a WRITE request is received to a particular VLU (requested VLU), prior to updating the data blocks of the VBA corresponding to the WRITE request, the current data blocks of the VBA are propagated (copied) to any child VLUs of the requested VLU. This is done to maintain the child VLUs as point-in-time copies of the requested VLU. To complete such propagation, the current data blocks are located, either within the requested VLU (cache or disk) or within its parent VLU (or its parent VLU, etc). FIG. 4 is a process flow diagram of a process by which a WRITE operation is requested and executed in accordance with one embodiment of the present invention. Process 400 begins at operation 405 in which a WRITE request to the requested VLU is received. The WRITE request pertains to specified VBAs of the requested VLU. At operation 410, the controller examines the MD slab tree of the requested VLU's MD structure to determine if the specified VBA is present, that is, a determination as to whether the specified DBA is located in the cache of the requested VLU. If the specified VBA is present in the MD slab tree, the data blocks corresponding to the specified VBA are propagated to any child VLUs of the requested VLU as described below in reference to operation 435.

At operation 415, if the specified VBA is not found in the MD slab tree, the controller examines the BSR of the MD structure of the requested VLU, to determine if a backing store on disk has been allocated to the specified VBA range and the valid bit is set. If so, it means that there is a valid copy of the requested data block that has been placed into the requested VLU, but has been flushed out of cache into disk.

At operation 420, if the specified VBA has been found in the BSR, the controller fetches the valid copy of the data block from disk into cache, and creates a corresponding MD entry in the MD slab tree of the requested VLU. A new MD slab is allocated if necessary. Once the valid copy of the data blocks has been retrieved from disk, they are propagated to any child VLUs of the requested VLU as described below in reference to operation 435.

At operation 425, if the specified VBA is not located in the MD slab tree or the BSR of the MD structure of the requested VLU, the controller examines the parent VLU pointer, if one exists, in the copy record of the MD structure of the requested VLU. The parent VLU of the requested VLU is then examined as described above in reference to operation 405–420, to determine if the VBA is located therein. This process is repeated recursively, for successive parent VLUs using the parent VLU pointer from each parent VLU, until the specified VBA/data block is located.

At operation 430, once the specified VBA/data block is located, it is copied into the requested VLU. That is, the specified VBA/data block is placed into a freshly allocated cache location, and a corresponding new entry is created in the requested VLU's MD slab tree. If the corresponding MD slab is not already present for the specified VBA range, then a new MD slab is allocated and linked into the MD slab tree of the requested VLU.

At operation 435, the specified VBA/data block is propagated to any child VLUs of the requested VLU. This is accomplished by repeatedly performing a WRITE operation to each of the child VLUs of the requested VLU. This propagation operation is not necessary for child VLUs that already contain a copy of the current data blocks of the specified VBA. For example, consider a VLU, VLU0, having four child VLUs, namely VLU1, VLU2, VLU3, VLU4. One of the child VLUs, for example, VLU3, may be modified (e.g., VBA 100 has been updated) and another child VLU, for example VLU 4 may be a parent of a subsequently created VLU, VLU5. At this point, if a WRITE operation to VBA 100 is received by VLU0, the current (existing) data block for VBA 100 in VLU0 is propagated into VLU1, VLU2, VLU4, but not VLU3 (because VBA 100 will already be found locally in VLU3). There is no need to propagate the current data block to VLU5, because VLU5 will continue to see the correct version of VBA 100 via VLU4, until that itself changes in VLU4.

At operation 440, the WRITE operation proceeds and the data blocks of the specified VBA are updated. For one embodiment, the propagation process excludes those data block locations that will be overwritten by the WRITE operation.

Read Operation

Figure 5:
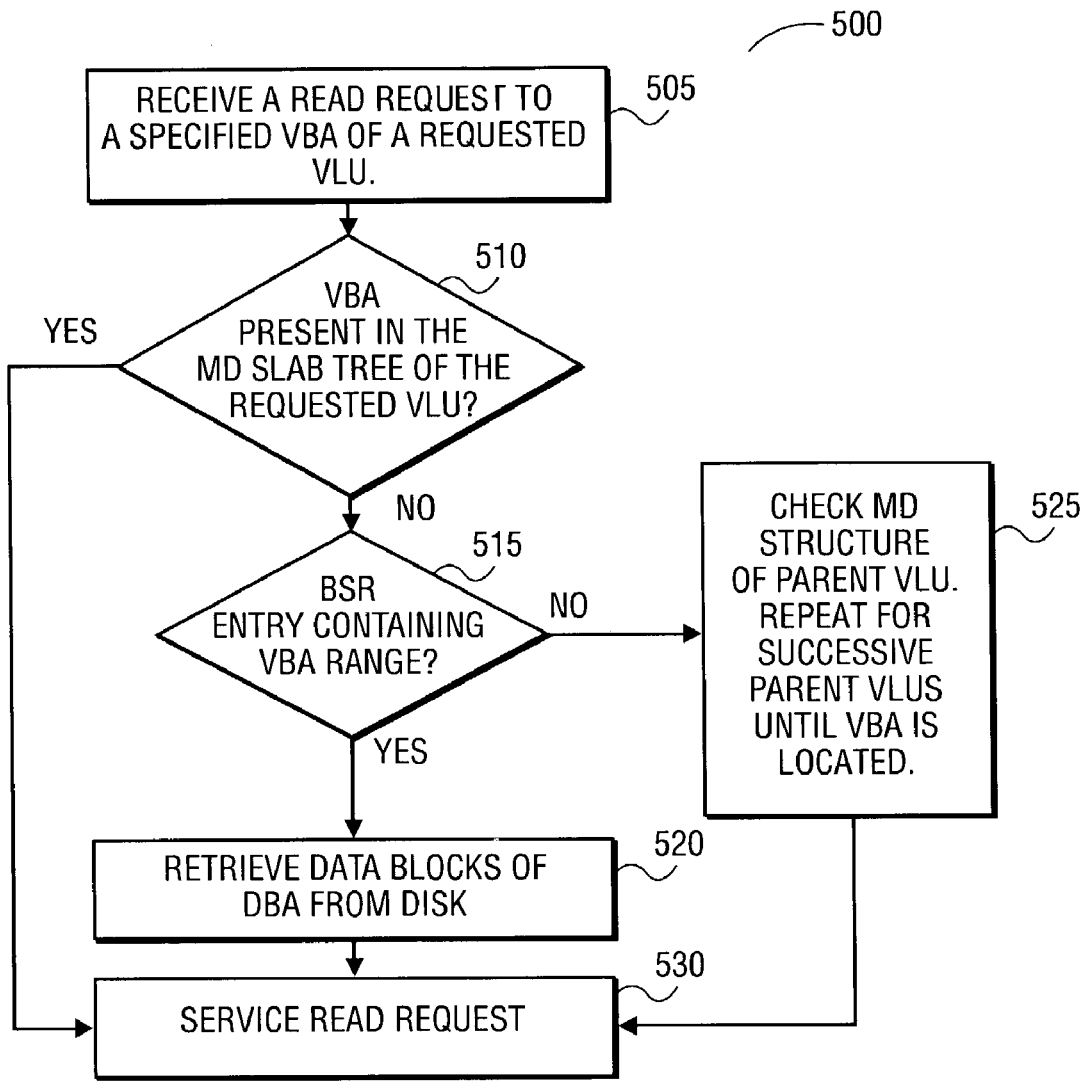
FIG. 5 is a process flow diagram of a process by which a READ operation is requested and executed in accordance with one embodiment of the present invention.

FIG. 5 is a process flow diagram of a process by which a READ operation is requested and executed in accordance with one embodiment of the present invention. Process 500, shown in FIG. 5 begins at operation 505 in which a READ request to a particular VLU (requested VLU) is received. The READ request pertains to specified VBAs of the requested VLU. At operation 510, the controller examines the MD slab tree of the requested VLU's MD structure to determine if the specified VBA is present, if the requested VBA is found in the MD slab tree of the requested VLU, then the data block is in cache. The READ request is then serviced at operation 530.

At operation 515, if the specified VBA is not found in the MD slab tree, the controller examines the BSR of the MD structure of the requested VLU, to determine if a backing store on disk has been allocated to the specified VBA range. If so, it means that there is a valid copy of the requested data block that has been placed into the requested VLU, but has been flushed out of cache into disk.

At operation 520, if the specified VBA has been found in the BSR, the controller fetches the valid copy of the data block from disk into cache, and creates a corresponding MD entry in the MD slab tree of the requested VLU. A new MD slab is allocated if necessary. The READ request is then serviced at operation 530.

At operation 525, if the specified VBA is not located in the MD slab tree or the BSR of the MD structure of the requested VLU, the controller examines the parent VLU pointer, if one exists, in the copy record of the MD structure of the requested VLU. The parent VLU of the requested VLU is then examined as described above in reference to operation 505–520, to determine if the VBA is located therein. This process is repeated recursively, for successive parent VLUs using the parent VLU pointer from each parent VLU, until the specified VBA/data block is located. The READ request is then serviced at operation 530.

General Matters

Embodiments of the invention may be implemented to reduce the time between when a command to create a point-in-time copy of a data store (a snapshot command) is received and when the data store and the copy are available to process I/O commands. Embodiments of the present invention may be implemented to reduce the amount of data and MD (and hence the amount of NVRAM allocated for MD storage) that is copied in response to a snapshot command.

In accordance with one embodiment of the present invention, the MD structure for each VLU includes, in addition to the tree of MD slabs, a BSR and a copy record. The BSR includes a number of entries each containing three fields. The first field indicates a contiguous VBA range represented by the entry. This VBA range is a fixed integral multiple of the contiguous VBA range represented by each MD slab. The second field contains a number of valid bits, each bit corresponding to each MD slab in the VBA range representing the BSR entry. The third field either points to a contiguously addressed region on a disk subsystem, appropriately sized to accommodate the data blocks for the VBA range of the BSR entry, or indicates that no disk storage space has been assigned for the VBA range. The copy record includes a "Parent VLU" field that includes a pointer to the MD structure of a parent VLU, and a "Child VLU" field having one or more pointers to child VLUs, if any.

The invention includes various operations. It will be apparent to those skilled in the art that the operations of the invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A computer-implemented method comprising: a) receiving a command to create a point-in-time copy of an original data store in a data storage system; b) suspending processing of input/output operations to the original data store; c) creating a metadata structure of a copy data store in the data storage system, the metadata structure of the copy data store containing a null metadata slab tree, a backing store register, and a copy record, the copy record containing a pointer to a metadata structure of the original data store, the metadata structure of the original data store containing a pointer to the metadata structure of the copy data store; and d) resuming processing of input/output operations to the original data store and to the copy data store.

2. The computer-implemented method of claim 1 wherein the original data store is a parent virtual logical unit (VLU) and the copy data store is a child VLU.

3. The computer-implemented method of claim 2 wherein operations a) through d) are repeated at a number of distinct times to create a plurality of child VLUs of the parent VLU, each child VLU a point-in-time copy of the parent VLU at a distinct time.

4. The computer-implemented method of claim 3 further comprising: e) receiving a write request to a specified virtual block address (VBA) of the parent VLU; f) determining the location of an original data block corresponding to the specified VBA; g) writing the original data block corresponding to the specified VBA to each of the plurality of child VLUs; and h) processing the write operation to the specified VBA of the parent VLU.

5. The computer-implemented method of claim 4, wherein operation f) comprises: successively searching a metadata slab tree of the metadata structure of the parent VLU, a backing store register of the metadata structure of the parent VLU, and a metadata slab tree and backing store register of successive parent VLUs for the specified VBA; and using the specified VBA to access the corresponding data block.

6. The computer-implemented method of claim 3 further comprising: e) receiving a read request to a specified virtual block address (VBA) of the parent VLU; f) determining the location of a data block corresponding to the specified VBA; and g) processing the read request to the specified VBA of the parent VLU.

7. The computer-implemented method of claim 6, wherein operation f) comprises: successively searching a metadata slab tree of the metadata structure of the parent VLU, a backing store register of the metadata structure of the parent VLU, and a metadata slab tree and backing store register of successive parent VLUs for the specified VBA; and using the specified VBA to access the corresponding data block.

8. A computer-readable memory for storing data comprising: a data structure stored on the memory, the data structure including a) a metadata slab tree to indicate data of a VLU stored in a cache memory, b) a backing store register to indicate data of the VLU, previously stored in cache memory, that has been flushed to disk, and c) a copy record indicating if the VLU is a point-in-time copy of a parent VLU, and if so, designating the parent VLU, and indicating if one or more child VLUs are point-in-time copies of the VLU, and is so, designating the one or more child VLUs.

9. The computer-readable memory for storing data of claim 8 wherein the slab tree is comprised of: a plurality of slabs, each slab containing a metadata table having a plurality of entries, each entry represents a contiguous range of block addresses and contains a cache pointer to a slot of a random access memory, the slot storing a data block corresponding to the block address; a block address range indicator to indicate the contiguous range of block addresses; and at least one slab pointer, each slab pointer pointing to a parent slab or a child slab.

10. The computer-readable memory for storing data of claim 9 wherein the backing store register is organized as a linear table having a VBA range field to indicate VBA ranges of the VLU, a validity masks field to indicate VBAs for which the corresponding data block has been previously copied to disk, and a disk extents field to indicate the allocated disk space to which the data blocks have been copied.

11. The computer-readable memory for storing data of claim 10 wherein the VBA range field contains VBA ranges that are integral multiples of the range of contiguous block addresses of the metadata table entries.

12. The computer-readable memory for storing data of claim 11 wherein the validity masks field contains a plurality of bits, each bit corresponding to one of the contiguous block addresses of the metadata table entries.

13. The computer-readable memory for storing data of claim 8 wherein the copy record contains a pointer to a parent VLU of the VLU, if any, and a pointer to each of one or more child VLUs of the VLU, if any.

14. A machine-readable medium having one or more executable instructions stored thereon, which when executed by a digital processing system, cause the digital processing system to perform a method, the method comprising: a) receiving a command to create a point-in-time copy of an original data store; b) suspending processing of input/output operations to the original data store; c) creating a metadata structure of a copy data store, the metadata structure of the copy data store containing a null metadata slab tree, a backing store register, and a copy record, the copy record containing a pointer to a metadata structure of the original data store, the metadata structure of the original data store containing a pointer to the metadata structure of the copy data store; and d) resuming processing of input/output operations to the original data store and to the copy data store.

15. The machine-readable medium of claim 14 wherein the original data store is a parent virtual logical unit (VLU) and the copy data store is a child VLU.

16. The machine-readable medium of claim 15 wherein operations a) through d) are repeated at a number of distinct times to create a plurality of child VLUs of the parent VLU, each child VLU a point-in-time copy of the parent VLU at a distinct time.

17. The machine-readable medium of claim 16 further comprising: e) receiving a write request to a specified virtual block address (VBA) of the parent VLU; f) determining the location of a data block corresponding to the specified VBA; g) writing the data block corresponding to the specified VBA to each of the plurality of child VLUs; and h) processing the write operation to the specified VBA of the parent VLU.

18. The machine-readable medium of claim 17, wherein operation f) comprises: successively searching a metadata slab tree of the metadata structure of the parent VLU, a backing store register of the metadata structure of the parent VLU, and a metadata slab tree and backing store register of successive parent VLUs for the specified VBA; and using the specified VBA to access the corresponding data block.

19. The machine-readable medium of claim 16 further comprising: e) receiving a read request to a specified virtual block address (VBA) of the parent VLU; f) determining the location of a data block corresponding to the specified VBA; and g) processing the read request to the specified VBA of the parent VLU.

20. The machine-readable medium of claim 19, wherein operation f) comprises: successively searching a metadata slab tree of the metadata structure of the parent VLU, a backing store register of the metadata structure of the parent VLU, and a metadata slab tree and backing store register of successive parent VLUs for the specified VBA; and using the specified VBA to access the corresponding data block.

21. A data storage system comprising: a storage media; a processing system; and a memory, coupled to the processing system, characterized in that the memory has stored therein instructions which, when executed by the processing system, cause the processing system to receive a command to create a point-in-time copy of an original data store; suspend processing of input/output operations to the original data store; create a metadata structure of a copy data store, the metadata structure of the copy data store containing a null metadata slab tree, a backing store register, and a copy record, the copy record containing a pointer to a metadata structure of the original data store, the metadata structure of the original data store containing a pointer to the metadata structure of the copy data store; and resume processing of input/output operations to the original data store and to the copy data store.

22. The data storage system of claim 21 wherein the original data store is a parent virtual logical unit (VLU) and the copy data store is a child VLU.

23. The data storage system of claim 22 wherein operations are repeated at a number of distinct times to create a plurality of child VLUs of the parent VLU, each child VLU a point-in-time copy of the parent VLU at a distinct time.

24. The data storage system of claim 23 wherein the instructions, when executed by a processor, further cause the processor to: receive a write request to a specified virtual block address (VBA) of the parent VLU; determine the location of a data block corresponding to the specified VBA; write the data block corresponding to the specified VBA to each of the plurality of child VLUs; and process the write operation to the specified VBA of the parent VLU.

25. The data storage system of claim 24, wherein determining the location of a data block corresponding to the specified VBA comprises: successively searching a metadata slab tree of the metadata structure of the parent VLU, a backing store register of the metadata structure of the parent VLU, and a metadata slab tree and backing store register of successive parent VLUs for the specified VBA; and using the specified VBA to access the corresponding data block.

26. The data storage system of claim 24 wherein the instructions, when executed by a processor, further cause the processor to: receive a read request to a specified virtual block address (VBA) of the parent VLU; determine the location of a data block corresponding to the specified VBA; and process the read request to the specified VBA of the parent VLU.

27. The data storage of claim 26, wherein determining the location of a data block corresponding to the specified VBA comprises: successively searching a metadata slab tree of the metadata structure of the parent VLU, a backing store register of the metadata structure of the parent VLU, and a metadata slab tree and backing store register of successive parent VLUs for the specified VBA; and using the specified VBA to access the corresponding data block.

* * * * *